(12) United States Patent
Chandersekaran et al.

(10) Patent No.: US 6,181,795 B1
(45) Date of Patent: Jan. 30, 2001

(54) PORTABLE CRYPTOGRAPHIC KEY (75) Inventors: Sekar Chandersekaran, Potomac; Narayanan Vasudevan, Gaithersburg; Sohail Malik, Gaithersburg; Michael Muresan, Gaithersburg, all of MD (US)

(73) Assignee: International Business Machines Corporation, Armonk, NY (US)

( * ) Notice: Under 35 U.S.C. 154(b), the term of this patent shall be extended for 0 days.

(21) Appl. No.: 09/031,793

(22) Filed: Feb. 27, 1998

(51) Int. Cl.[7] .................................................. H04L 9/00
(52) U.S. Cl. ........................ 380/280; 713/153; 713/171
(58) Field of Search ............................ 380/280; 713/153, 713/171

(56) References Cited

U.S. PATENT DOCUMENTS

| | | | |
|---|---|---|---|
| 5,263,137 | * 11/1993 | Anezaki et al. | 709/246 |
| 5,418,963 | * 5/1995 | Anezaki et al. | 717/5 |
| 5,649,227 | * 7/1997 | Anezaki et al. | 712/1 |
| 5,778,360 | * 7/1998 | Sugita et al. | 707/4 |
| 5,796,830 | * 8/1998 | Johnson et al. | 380/286 |
| 5,815,573 | * 9/1998 | Johnson et al. | 380/286 |
| 5,870,749 | * 2/1999 | Adusumilli | 707/101 |

OTHER PUBLICATIONS

Telecommunication Standardization Sector of ITU, X509 Information Technology–Open Systems Interconnection–the Directory: Authentication Framework, Nov. 1993, Section 8.*

* cited by examiner

*Primary Examiner*—Tod R Swann
*Assistant Examiner*—Ronald F. Sulpizio, Jr.
(74) *Attorney, Agent, or Firm*—Morgan & Finnegan, LLP (57) ABSTRACT

A method, system, and computer program are disclosed to transport an encrypted key across multiple, diverse systems which provides the relevant and necessary information to guarantee a successful decryption of the key. The method prepares an ASN.1 encoding file at the sender which contains the key. The receiver performs the method to decode the ASN.1 encoded file. In this manner, only the data and the contents of the portable key need to be sent to guarantee successful decryption at the receiver.

6 Claims, 7 Drawing Sheets

```
Portable Key Info = {

• Portable Key Header = {

— Cryptographic Algorithm Identifier, Algorithm Usage,
          and Related Parameters, — Cryptographic Key Data Format and Related
          Parameters } End Portable Key Header

• Portable Key Data = {

— Variable Length Byte Stream

} End Portable Key Header

} End Portable Key Info
```

Portable Key Info = {

- Portable Key Header = {

— Cryptographic Algorithm Identifier, Algorithm Usage, and Related Parameters,

— Cryptographic Key Data Format and Related Parameters

}End Portable Key Header

- Portable Key Data = {

— Variable Length Byte Stream

}End Portable Key Header

}End Portable Key Info

FIG. 2

Portable Key Info = {

- Portable Key Header = {
    - Cryptographic Algorithm Identifier=Required Symmetric Key Algorithm Identifier (e.g., DES, TDES, RC2),
    - Algorithm Usage=Encrypt or Decrypt,
    - Algorithm Identifier Related Parameters=
        - Other Parameters=As Required,
        - Key Class=Secret
    - Cryptographic Key Data Format and Related Parameters=
        - Format=Required Format Type,
        - Init Vector, Padding, Parameters=Required Values,
        - Other Parameters=Required Values
  } End Portable Key Header

- Portable Key Data = {
    - Byte Stream of Size Specified In Format Data
  } End Portable Key Data } End Portable Key Info

FIG. 3A

Portable Key Info = {

- Portable Key Header = {

— Cryptographic Algorithm Identifier=Required
  Asymmetric Key Algorithm Identifier (e.g., RSA,
  DSA, PGP), — Algorithm Usage=Required Usage Type, — Algorithm Identifier Parameters=

- Key Class=Public or Private,
  - Other Parameters=Required Values

— Cryptographic Key Data Format Parameters=

— Format=Required Type (e.g., PKCS#, PGP),
  — Mode and Related Optional Parameters=None } End Portable Key Header

- Portable Key Data = {

— Byte Stream of Size Specified In Format

} End Portable Key Header

} End Portable Key Info

FIG. 3B

1. Create the ASN.1 format for PortableKeyInfo as a file of type asn (e.g., RequiredPortableKeyInfo.asn)

2. Run an appropriate tool (*e.g., ASN.1 compiler*) by:
   - Feeding the platform-independent ASN.1 file as input, and
   - Generating platform-specific output files (e.g., *RequiredPortableKeyInfo.h and RequiredPortableKeyInfo.c*) on the required target platforms (e.g., *IBM AIX 4.2 on IBM RS/6000, Win95 on Intel Pentium processor, Sun/Solaris OS on SUN/SPARC processor*)

3. Create platform-specific data values representing the portable key information based on the platform-specific data structure definitions generated in Step 2 above.

4. Use the platform-specific ASN.1 encoding functions to create the ASN.1 encoded Protocol Data Unit (PDU) corresponding to the portable key information.

An example of these steps is as follows:
   — InitializePDU (PortableKeyInfoName)
   — OpenPDU (PortableKeyInfoName)
   — EncodePDU
      (Input:  Platform-specific data,
      Output:  ASN.1 encoded data)
   — ClosePDU (PortableKeyInfoName)

FIG. 4

1. Create the ASN.1 format for PortableKeyInfo as a file of type asn (e.g., RequiredPortableKeyInfo.asn)

2. Run an appropriate tool (*e.g., ASN.1 compiler*) by:
   - Feeding the platform-independent ASN.1 file as input, and
   - Generating platform-specific output files (e.g., *RequiredPortableKeyInfo.h* and *RequiredPortableKeyInfo.c*) on the required target platforms (e.g., *IBM AIX 4.2 on IBM RS/6000, Win95 on Intel Pentium processor, Sun/Solaris OS on SUN/SPARC processor*)

3. Use the platform-specific ASN.1 encoding functions to decode the ASN.1 encoded Protocol Data Unit (PDU) to obtain the platform-specific key information.

An example of these steps is as follows:
   — InitializePDU (PortableKeyInfoName)
   — OpenPDU (PortableKeyInfoName)
   — DecodePDU
     (Input: ASN.1 encoded data,
     Output: Platform-specific data)
   — ClosePDU (PortableKeyInfoName)

FIG. 5

PORTABLE CRYPTOGRAPHIC KEY

BACKGROUND OF THE INVENTION

1. Field of the Invention

This invention relates to a cryptographic key management system.

2. Description of the Related Art

Copending U.S. patent application of D. B. Johnson et al., Ser. No. 08/629,815 (U.S. Pat. No. 5,815,573), filed Apr. 10, 1996, entitled "Cryptographic Key Recovery System" ("Johnson et al. I"), assigned to the International Business Machines Corporation, is incorporated herein by reference. This cited patent application describes a key recovery system using multiple key recovery agents.

Copending application of D. B. Johnson et al., Ser. No. 08/681,679 (U.S. Pat. No. 5,796,830), filed Jul. 29, 1996, entitled "Interoperable Cryptographic Key Recovery System" ("Johnson et al. II"), assigned to the International Business Machines Corporation, is incorporated herein by reference. This cited patent application describes another key recovery system.

Copending provisional application of Sekar Chandersekaran and Sarbari Gupta, Ser. No. 60/047,499, filed May 23, 1997, and the copending regular patent application derived therefrom, Ser. No. 08/971,204, filed Nov. 14, 1997, entitled "FRAMEWORK-BASED". CRYPTOGRAPHIC KEY RECOVERY SYSTEM", assigned to the International Business Machines Corporation, is incorporated herein by reference.

BACKGROUND

In recent times, cryptography has come into widespread use in meeting multiple security needs, such as confidentiality, integrity, authentication and non-repudiation. When data is encrypted using a particular cryptographic algorithm, data is fed into a cryptographic engine along with key material and encryption parameters. When decryption occurs, a similar process must occur and the two keys must match (they must be identical in the case of symmetric encryption and be mathematically related in the case of asymmetric encryption).

Currently, when a key has to be transported across multiple systems and/or over a network connection, there exists no standard technique to guarantee that the relevant and necessary information is transmitted to guarantee a successful decryption. Application in distributed environments, in particular, have to make assumptions about the way that encryption was done. They also have to make assumptions about the format of key data that they receive. We define a technique by which we encode all the appropriate information into a "portable key" so that only the data and the contents of the portable key are needed to guarantee successful decryption using the appropriate cryptographic engine.

SUMMARY OF THE INVENTION

The invention is a method, system, and computer program to transport an encrypted key across multiple, diverse systems which provides the relevant and necessary information to guarantee a successful decryption of the key. The method prepares an ASN.1 encoding file at the sender which contains the key. The method begins by creating the ASN.1 format for portable key information. The ASN.1 compiler is run, feeding the platform-independent ASN.1 file as input, and generating platform-specific output files. Then platform-specific data values are created representing the portable key information based on the platform-specific data structure definitions just generated. Then, the platform-specific ASN.1 encoding functions are used to create the ASN.1 encoded protocol data unit (PDU) corresponding to the portable key information. The ASN.1 encoded protocol data unit (PDU) is then sent to the receiver node.

At the time of decryption, the receiver performs the method to decode the ASN.1 encoded file. The method begins by creating the ASN.1 format for portable key information. The ASN.1 compiler is run, by feeding the platform-independent ASN.1 file as input, and generating platform specific output files. Then platform-specific data values are created representing the portable key information based on the platform-specific data structure definitions just generated. Then, the platform-specific ASN.1 decoding functions are used to decode the ASN.1 encoded protocol data unit (PDU) to obtain the platform-specific key information. The platform-specific key information is then used at the receiving node for normal cryptographic operations. In this manner, only the data and the contents of the portable key are needed to guarantee successful decryption.

DESCRIPTION OF THE PREFERRED EMBODIMENTS

The International Standards Organization (ISO), the International Electrotechnical Commission (IEC) and the International Telecommunications Union—Telecommunications Sector (ITU-T) (formerly known as the International Telegraph and Telephone Consultative Committee (CCITT)) have established Abstract Syntax Notation One (ASN.1) and its encoding rules as a standard for describing and encoding messages.

ASN.1 is a formal language for abstractly describing data to be exchanged between distributed computer systems. ASN.1 frees protocol designers to describe the layout of messages exchanged between application programs running in typically dissimilar hardware and software environments. The term abstract is used because ASN.1 doesn't describe the bits and bytes details of how messages are laid out while in transit between two machines; rather, it describes the message layout at a higher, more abstract level. Enclosing rules are sets of rules used to transform data specified in the ASN.1 language into a standard format that can be decoded by any system that has a decoder based on the same set of rules.

Relevant Citations

CCITT, Recommendations X.680, "Information Technology—Abstract Syntax Notation One (ASN.1)— Specification of Basic Notation, "Consultation Committee, International Telephone and Telegraph, International Telecommunications Union, Geneva, 1994.

CCITT, Recommendations X.690, "Information Technology—ASN.1 Encoding Rules—Specification of Basic Encoding Rules (BER), Canonical Encoding Rules (CER) and Distinguished Encoding Rules (DER)" Consultation Committee, International Telephone and Telegraph, International Telecommunications Union, Geneva, 1994.

CCITT, Recommendations X.691, "Information Technology—ASN.1 Encoding Rules— Packed Encoding Rules (PER)" Consultation Committee, International Telephone and Telegraph, International Telecommunications Union, Geneva, 1994.

Figure 1A:
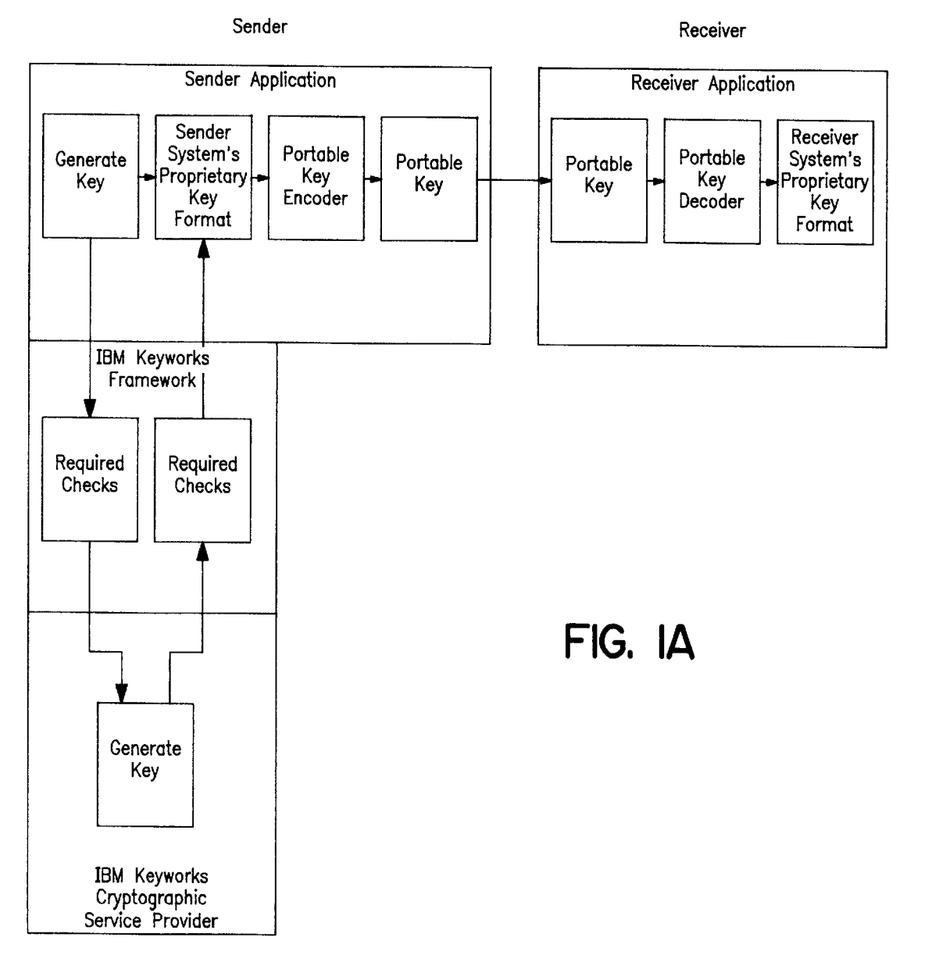
FIG. 1A is a network diagram showing a sender and receiver nodes using the invention.

The invention disclosed herein defines an ASN.1 encoding file that can represent all keys and all possible parameters using unique object identifiers. FIG. 1A is a network diagram showing a sender and receiver nodes using the invention. A sender application in the sender node generates a key with a generate key function in the sender system's proprietary key format and passes it to the portable key encoder which outputs a portable key. Associated with the sender application at the sender node is an IBM Keyworks framework and an IBM Keyworks Cryptographic Service Provider, as is described in the above referenced copending patent application entitled "FRAMEWORK-BASED CRYPTOGRAPHIC KEY RECOVERY SYSTEM". The Framework provides the required checks of the key from the generate key function. The portable key produced at the sender node is sent to the receiver node. A receiver application at the receiver node receives the portable key and the portable key decoder decodes it and outputs the decoded value in the receiver system's proprietary key format.

Figure 1B:
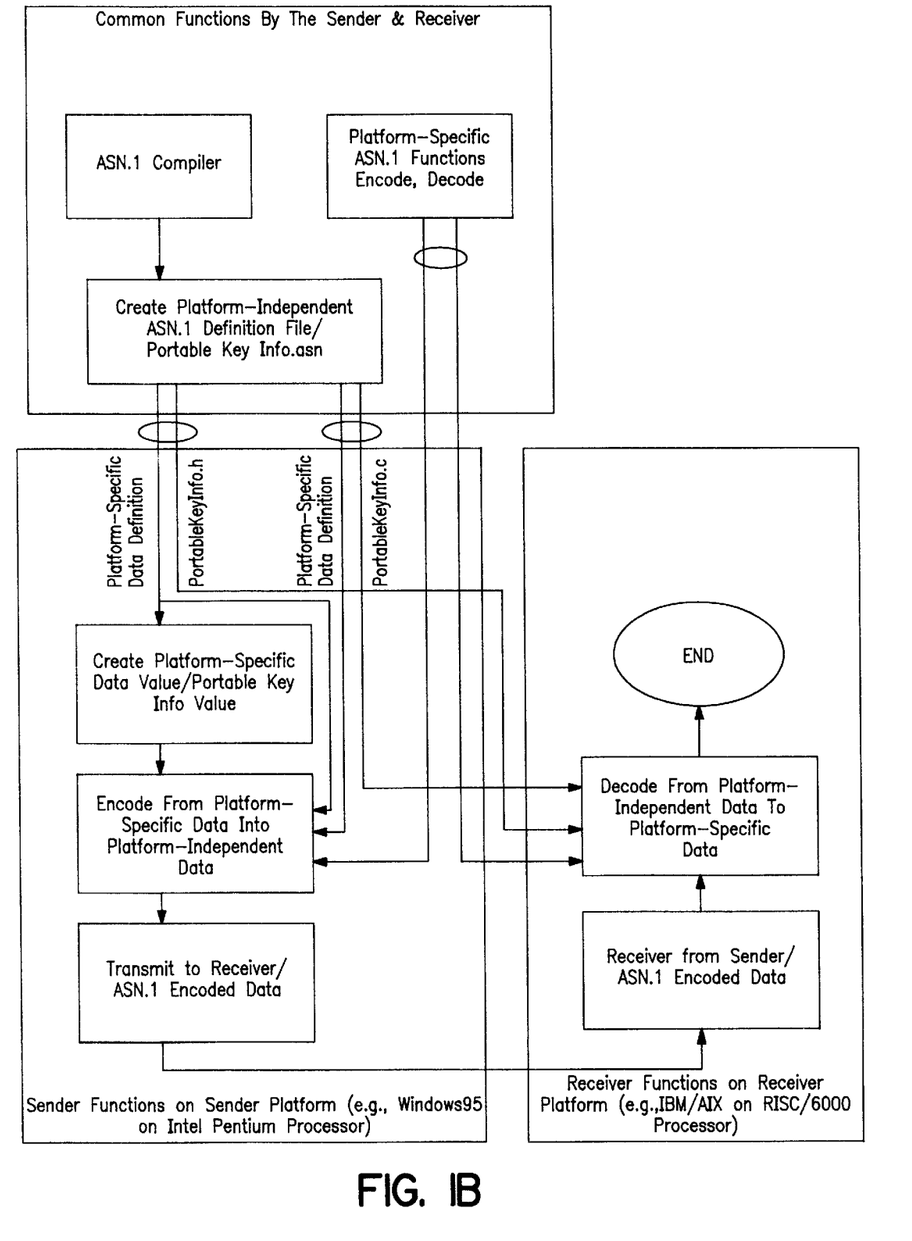
FIG. 1B illustrates the overall processing at the sender and receiver nodes.

FIG. 1B illustrates the overall processing at the sender and receiver nodes. One of the common functions at the sender and receiver nodes is the ASN.1 compiler, that outputs a platform-independent ASN.1 definition file with the portable key information. Another common function at the sender and receiver nodes are the platform specific ASN.1 functions to encode and decode the portable key.

FIG. 1B also illustrates the sender functions on the sender platform, such as the Microsoft Windows 95 operating system running on an Intel Pentium processor. A platform specific data definition is input to create a platform specific data value and portable key information. The portable key information is then encoded from platform specific data into platform independent data, which is transmitted in the ASN.1 format to the receiver.

FIG. 1B also illustrates the receiver functions on the receiver platform, such as the IBM/AIX operating system running on an IBM RISC/6000 processor. The encoded portable key information which is received, is decoded from platform independent data to platform specific data.

Figure 2:
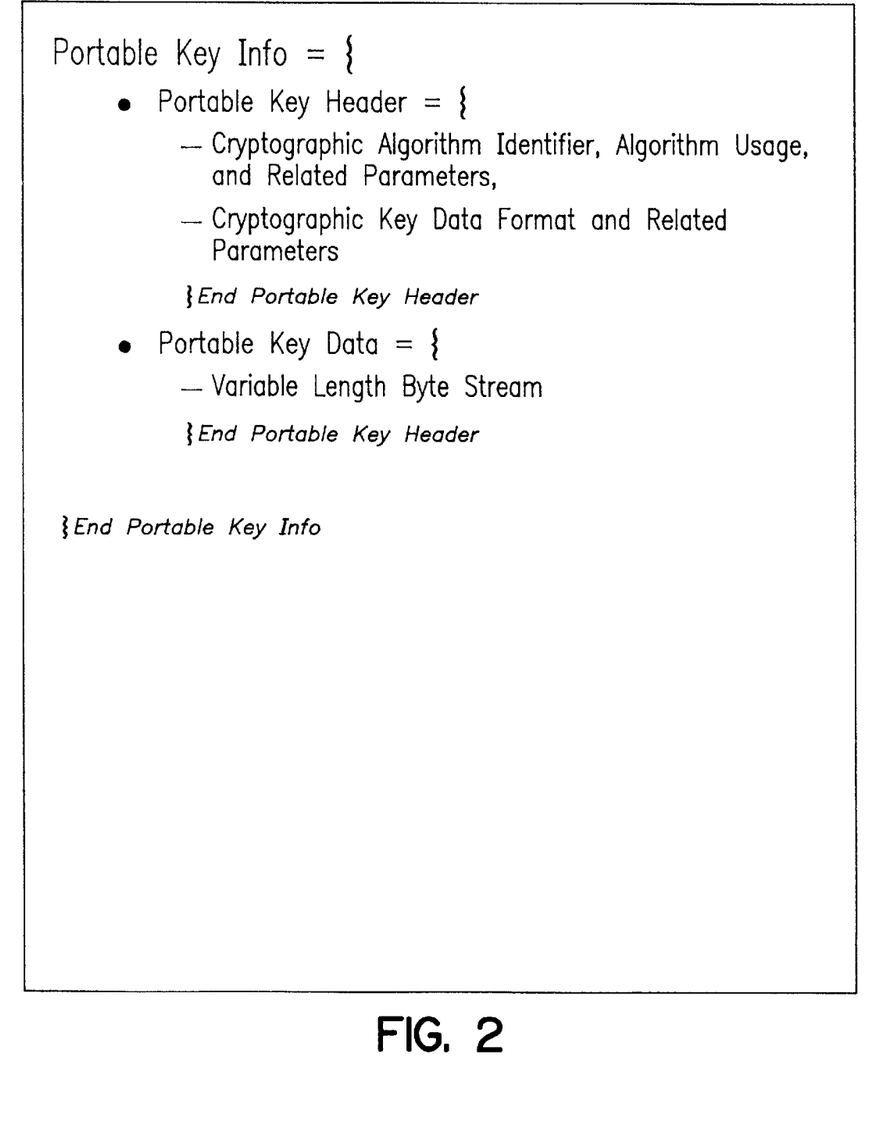
FIG. 2 illustrates the format of the ASN.1 encoding file
Figure 3A:
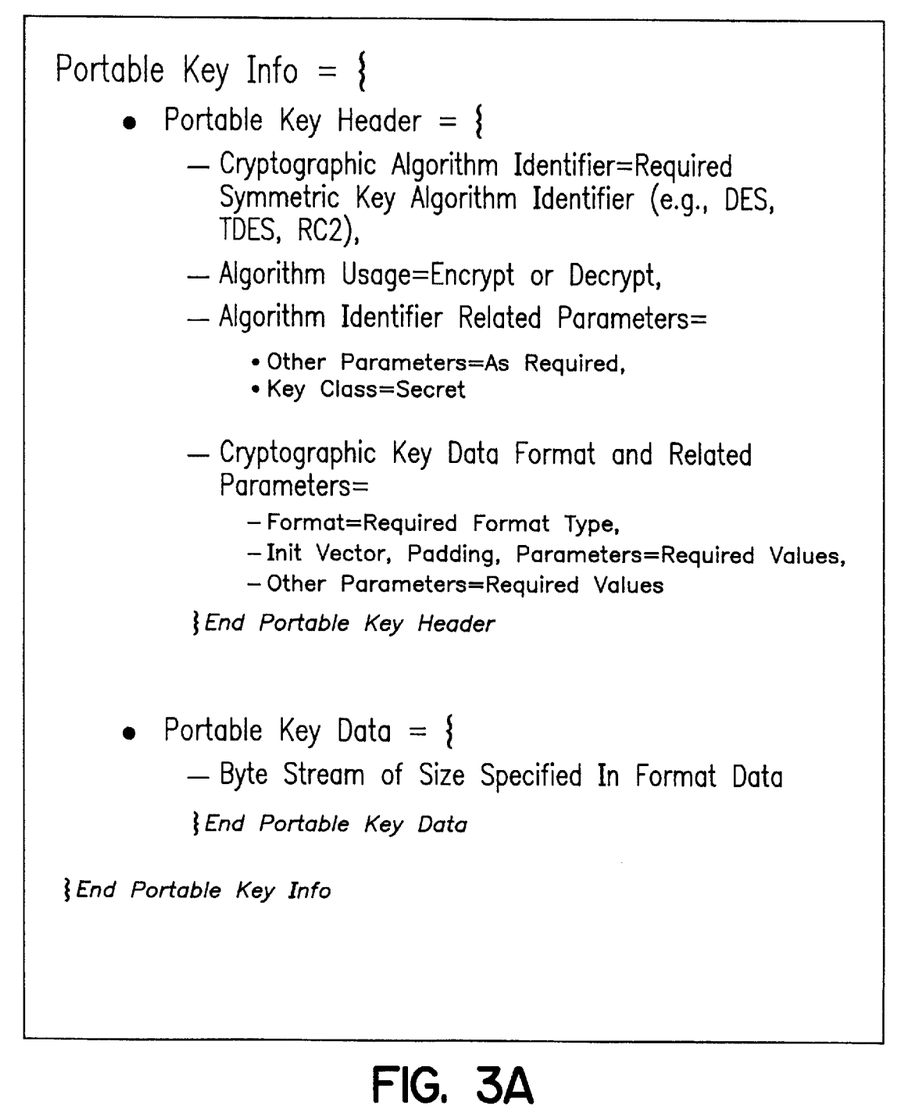
FIG. 3A illustrates the encoding file for a symmetric key
Figure 3B:
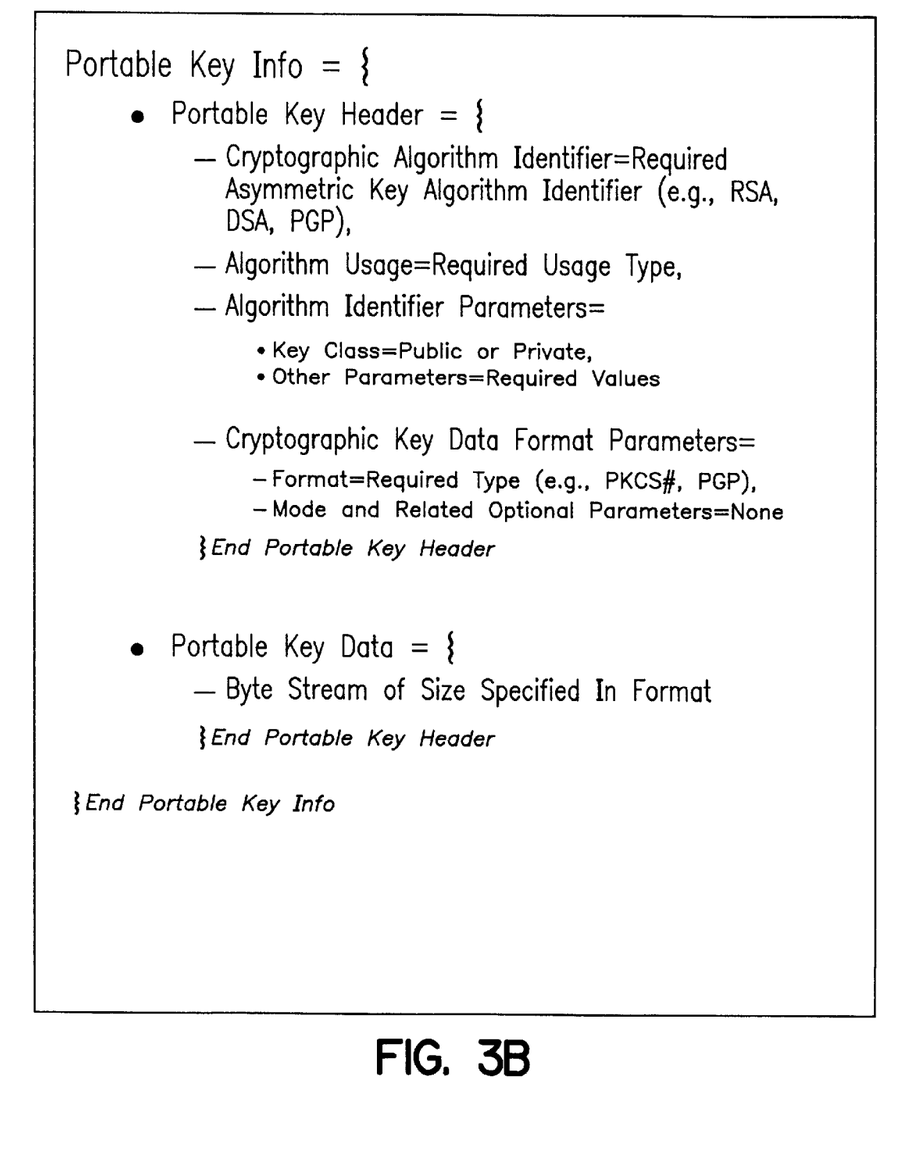
FIG. 3B illustrates the encoding file for an asymmetric key

FIG. 2 illustrates the format of the ASN.1 encoding file for a portable key, in accordance with the invention. The format includes portable key information that includes a portable key header and portable key data. FIG. 3A illustrates the format of the ASN.1 encoding file for a symmetric key. The format includes portable key information that includes a portable key header with a cryptographic algorithm identifier, algorithm usage, and related parameters, and the cryptographic key data format and related parameters. The portable key data includes the byte stream of the size specified in the format data. FIG. 3B illustrates the format of the ASN.1 encoding file for an asymmetric key. The format includes portable key information that includes a portable key header with a cryptographic algorithm identifier, algorithm usage, and related parameters, and the cryptographic key data format and related parameters. The portable key data includes the byte stream of the size specified in the format data.

The encoder/decoder functions corresponding to this ASN.1 definition have been generated using an ASN.1 compiler.

Figure 4:
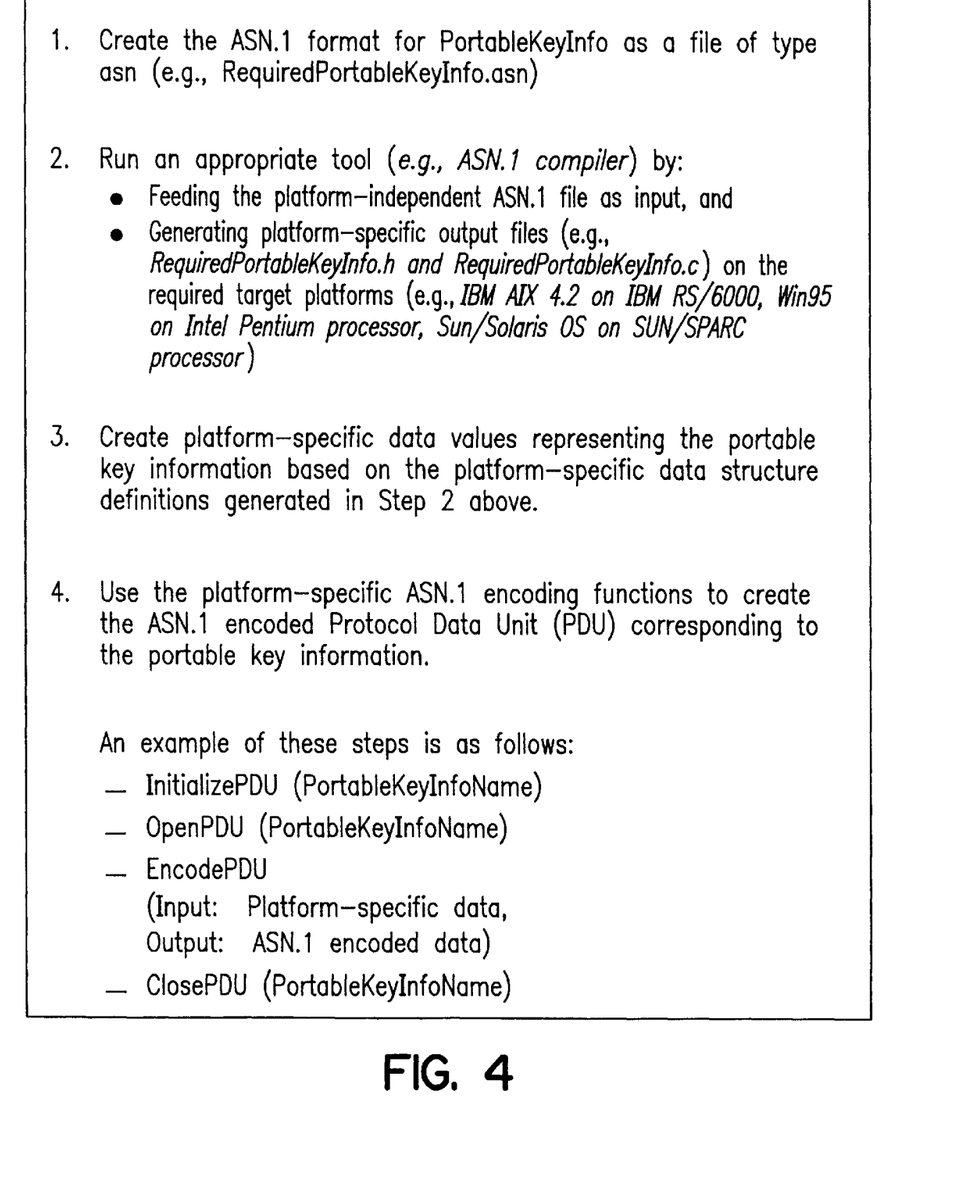
FIG. 4 illustrates the method to prepare the ASN.1 encoding file at the sender.

At the time of encryption, the key material and corresponding parameters for the algorithm are fed into an encode function that produces a portable key. FIG. 4 illustrates the method to prepare the ASN.1 encoding file at the sender. The method begins by creating the ASN.1 format for portable key information as a file of type "asn" (e.g., RequiredPortableKeyInfo.asn). The appropriate tool is run, for example the ASN.1 compiler, by feeding the platform-independent ASN.1 file as input, and generating platform specific output files. Then platform-specific data values are created representing the portable key information based on the platform-specific data structure definitions just generated. Then, the platform-specific ASN.1 encoding functions are used to create the ASN.1 encoded protocol data unit (PDU) corresponding to the portable key information. The ASN.1 encoded protocol data unit (PDU) is then sent to the receiver node. This portable key bytestream may be distributed by an mechanism such as distributed file system, direct network connections, etc. An example of these steps is as follows:

InitializePDU (PortableKeyInfoName)

OpenPDU (PortableKeylnfoName)

EncodePDU (Input: Platform-specific data,

Output: ASN.1 encoded data)

ClosePDU (PortableKeyInfoName)

Figure 5:
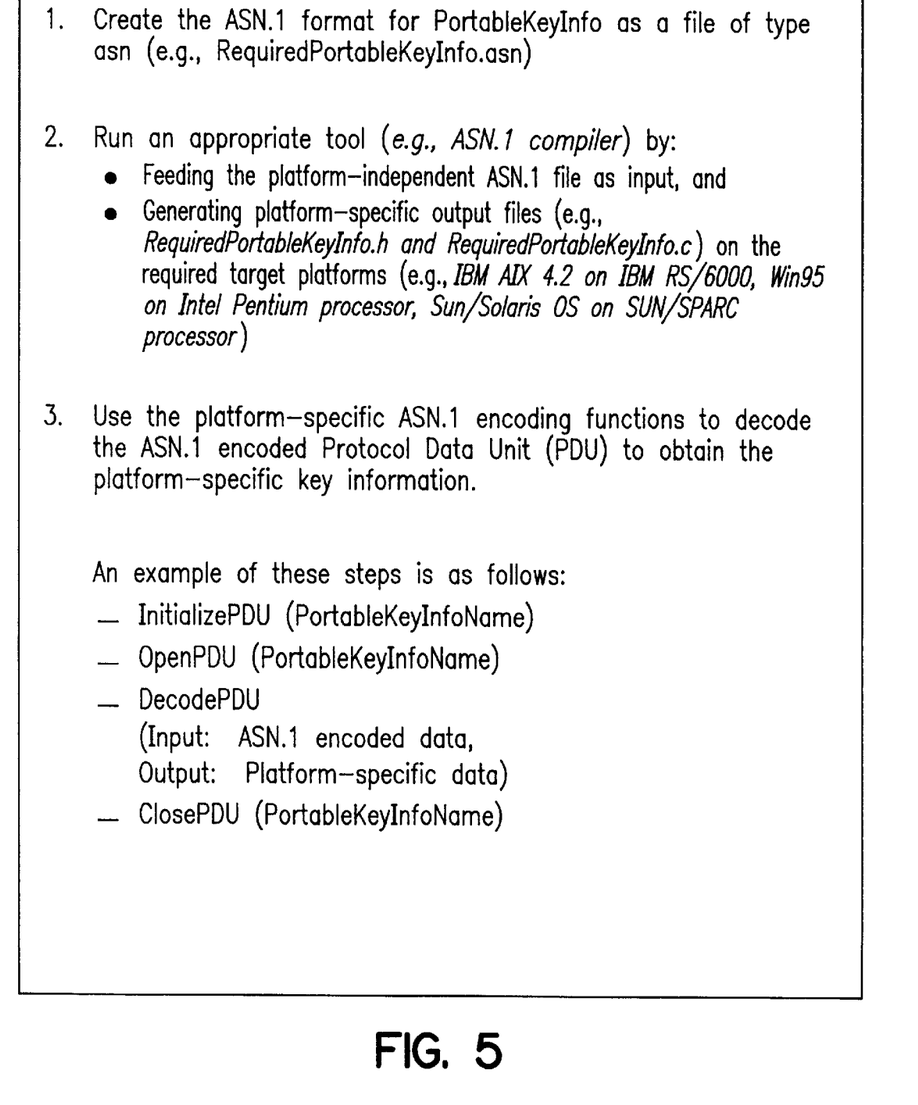
FIG. 5 illustrates the method to decode the ASN.1 encoding file at the receiver.

At the time of decryption, the portable key is fed into the decoder function and the key material and corresponding parameters are created. In addition to this information, only the data to be decrypted is needed by the decryption algorithm to perform a successful decryption. FIG. 5 illustrates the method to decode the ASN.1 encoded file at the receiver. The method begins by creating the ASN.1 format for portable key information as a file of type "asn" (e.g., RequiredPortableKeyInfo.asn). The appropriate tool is run, for example the ASN.1 compiler, by feeding the platform-independent ASN.1 file as input, and generating platform specific output files. Then platform-specific data values are created representing the portable key information based on the platform-specific data structure definitions just generated. Then, the platform-specific ASN.1 decoding functions are used to decode the ASN.1 encoded protocol data unit (PDU) to obtain the platform-specific key information. The platform-specific key information is then used at the receiving node for normal cryptographic operations. An example of these steps is as follows:

InitializePDU (PortableKeyInfoName)

OpenPDU (PortableKeylnfoName)

DecodePDU (Input: ASN.1 encoded data,

Output: Platform-specific data)

ClosePDU (PortableKeyInfoName)

The portable key bytestream may be distributed by any mechanism such as distributed file system, direct network connections, etc.

This method provides a uniform way to encode key-related information needed to encrypt and decrypt data with no reliance on additional methods to provide algorithm-specific information.

```
-- ASN.1 Type Definitions for a Generic, Portable Key
PortableKeyInfo DEFINITIONS              ::=         BEGIN
PortableKeyInfo      ::= SEQUENCE        {
    keyVersion        Uint32,            -- Version number of the key structure
    cspId             Guid,              -- crypto service provider Id
    algorithmId       Uint32,            -- Crypto algorithm Id
    blobType          Uint32,            -- raw_type, wrapped_type, reference, . . .
    format            Uint32,            -- PKCS_version, PGP, CDSA, FIPS186, MSCAPI, . . .
    keyStatus   [0]   Uint32                 OPTIONAL,
                                         -- ISO 11770 Key Life Cycle Management attribute:
                                         -- pending active, active, or post active
    keyClass          Uint32,            -- public, private, secret, . . .
    keySizeInBits     Uint32,
    keyAttr           Uint32,            -- permanent, private, modifiable, . . .
    keyUsage          Uint32,            -- encrypt, decrypt, sign, verify, wrap, unwrap
    startDate         GeneralizedTime,
    endDate           GeneralizedTime,
    wrapAlgorithmId   Uint32,
    wrapMode          Uint32,
    reserved          Uint32,
    mode        [1]   Uint32             OPTIONAL, -- Cipher Block Chaining, . . .
    initVector  [2]   OCTET STRING       OPTIONAL, -- initialization vector
    padding     [3]   Uint32             OPTIONAL,
    parameters  [4]   OCTET STRING       OPTIONAL,
    keyData     [5]   OCTET STRING       OPTIONAL
}
Uint32              ::=    INTEGER(0 . . . 4294967295)
Uint16              ::=    INTEGER(0 . . . 65535)
Guid                ::=    SEQUENCE         {
    data1                  Uint32,
    data2                  Uint16,
    data3                  Uint16,
    data4                  OCTET STRING (SIZE(8))
}
END
```

This portable key definition has been used to achieve interoperability in our IBM KeyWorks product suite which consists of:
1. IBM KeyWorks Toolkit (cryptographic and certificate services framework+service providers)
2. IBM Key Recovery Service Provider (key recovery service provider which generates key recovery blocks)
3. IBM Key Recovery Server (server which recovers (portable cryptographic) keys when presented with key recovery blocks from authorized parties)

The ASN.1 specification for the Portable Key Structure is a generic structure, which covers all key types. The keyClass attribute in the PortableKeyInfo structure distinguishes symmetric keys for asymmetric keys (public/private keys are asymmetric, secret keys are symmetric keys).

A portable cryptographic key is encoded and decoded by following these steps:
1. Software that processes the ASN.1 encoded data structure must be created for encoding keys (usually prior to sending) and decoding keys (usually after receiving)— This may be done manually by writing what is effectively an ASN.1 standard compliant parser. Alternatively, a ASN.1 compiler may be used to automate this process. ASN.1 compilers read in an ASN.1 encoding file and generate data structure definitions and encode/decode function (subroutine) source code in a given target language (e.g., C) for a given target machine (e.g., Windows NT).
2. The encode function (previously generated by the compiler) must be called; its input is the language-specific, machine-specific data structure representing the key semantics; its output is a portable byte stream which can be decoded by the corresponding decode function (which may be implemented in a different language and a different machine type). E.g., the encode may be in C on Windows NT, but the decode may be in Java on the AIX operating system.
3. When the portable byte stream is received, it is fed to the appropriate decode function to obtain the original key in a form usable on the target machine.

This invention is useful in any environment where cryptographic keys are used and portability is required. For example, it is very useful in the Internet environment where many different parties need keys to provide security services like confidentiality, message integrity, etc.

We use the portable cryptographic key in our IBM KeyWorks product suite so that we can generate keys on one machine type and recover it in a usable form on a different machine type.

Although a specific embodiment of the invention has been disclosed, it will be understood by those having skill in the art that changes can be made to that specific embodiment without departing from the spirit and scope of the invention.

What is claimed is:

1. A method for providing portable cryptographic keys, comprising:

creating an ASN.1 format for portable key information at a sender node;

generating first platform-specific data structure definitions at the sender node;

creating first platform-specific data values at the sender, representing portable key information based on the first platform-specific data structure definitions;

encoding portable key information at the sender using first platform-specific ASN.1 encoding functions to create a platform independent ASN.1 encoded protocol data unit (PDU) corresponding to the portable key information;

sending the platform independent ASN.1 encoded protocol data unit (PDU) to a receiver node;

creating said ASN.1 format for portable key information at the receiver node;

generating second platform-specific data structure definitions at the receiver node; and decoding the platform independent ASN.1 encoded protocol data unit (PDU) using second platform-specific ASN.1 decoding functions to obtain second platform-specific key information at the receiver node.

2. A method for providing portable cryptographic keys, comprising:

creating a format for portable key information at a sender node;

generating first platform-specific data structure definitions at the sender node;

creating first platform-specific data values at the sender, representing portable key information based on the first platform-specific data structure definitions;

encoding portable key information at the sender using first platform-specific encoding functions to create a platform independent encoded protocol data unit (PDU) corresponding to the portable key information;

sending the platform independent encoded protocol data unit (PDU) to a receiver node;

creating said format for portable key information at the receiver node;

generating second platform-specific data structure definitions at the receiver node; and decoding the platform independent encoded protocol data unit (PDU) using second platform-specific decoding functions to obtain second platform-specific key information at the receiver node.

3. A system for providing portable cryptographic keys, comprising:

means for creating an ASN.1 format for portable key information at a sender node;

means for generating first platform-specific data structure definitions at the sender node;

means for creating first platform-specific data values at the sender, representing portable key information based on the first platform-specific data structure definitions;

means for encoding portable key information at the sender using first platform-specific ASN.1 encoding functions to create a platform independent ASN.1 encoded protocol data unit (PDU) corresponding to the portable key information;

means for sending the platform independent ASN.1 encoded protocol data unit (PDU) to a receiver node;

means for creating said ASN.1 format for portable key information at the receiver node;

means for generating second platform-specific data structure definitions at the receiver node; and means for decoding the platform independent ASN.1 encoded protocol data unit (PDU) using second platform-specific ASN.1 decoding functions to obtain second platform-specific key information at the receiver node.

4. A system for providing portable cryptographic keys, comprising:

a first processor programmed to create a format for portable key information at a sender node;

said first processor generating first platform-specific data structure definitions at the sender node;

said first processor programmed to create first platform-specific data values at the sender, representing portable key information based on the first platform-specific data structure definitions;

said first processor encoding portable key information at the sender using first platform-specific encoding functions to create a platform independent encoded protocol data unit (PDU) corresponding to the portable key information;

a transmitter coupled to said first processor for sending the platform independent encoded protocol data unit (PDU) to a receiver node;

a second processor programmed to create said format for portable key information at the receiver node;

said second processor generating second platform-specific data structure definitions at the receiver node; and said second processor programmed to decode the platform independent encoded protocol data unit (PDU) using second platform-specific decoding functions to obtain second platform-specific key information at the receiver node.

5. An article of manufacture for use in a computer, comprising:

a computer useable medium having computer readable program code means embodied therein for providing portable cryptographic keys, comprising:

computer readable program code means for causing a computer to create an ASN.1 format for portable key information at a sender node;

computer readable program code means for causing a computer to generate first platform-specific data structure definitions at the sender node;

computer readable program code means for causing a computer to create first platform-specific data values at the sender, representing portable key information based on the first platform-specific data structure definitions;

computer readable program code means for causing a computer to encode portable key information at the sender using first platform-specific ASN.1 encoding functions to create a platform independent ASN.1 encoded protocol data unit (PDU) corresponding to the portable key information;

computer readable program code means for causing a computer to send the platform independent ASN.1 encoded protocol data unit (PDU) to a receiver node;

computer readable program code means for causing a computer to create said ASN.1 format for portable key information at the receiver node;

computer readable program code means for causing a computer to generate second platform-specific data structure definitions at the receiver node; and computer readable program code means for causing a computer to decode the platform independent ASN.1 encoded protocol data unit (PDU) using second platform-specific ASN.1 decoding functions to obtain second platform-specific key information at the receiver node.

6. An article of manufacture for use in a computer, comprising:

a computer useable medium having computer readable program code means embodied therein for providing portable cryptographic keys, comprising:

computer readable program code means for causing a computer to create a format for portable key information at a sender node;

computer readable program code means for causing a computer to generate first platform-specific data structure definitions at the sender node;

computer readable program code means for causing a computer to create first platform-specific data values at the sender, representing portable key information based on the first platform-specific data structure definitions;

computer readable program code means for causing a computer to encode portable key information at the sender using first platform-specific encoding functions to create a platform independent encoded protocol data unit (PDU) corresponding to the portable key information;

computer readable program code means for causing a computer to send the platform independent encoded protocol data unit (PDU) to a receiver node;

computer readable program code means for causing a computer to create said format for portable key information at the receiver node;

computer readable program code means for causing a computer to generate second platform-specific data structure definitions at the receiver node; and computer readable program code means for causing a computer to decode the platform independent encoded protocol data unit (PDU) using second platform-specific decoding functions to obtain second platform-specific key information at the receiver node.

* * * * *